United States Patent [19]

Mann

[11] Patent Number: 5,349,655
[45] Date of Patent: Sep. 20, 1994

[54] METHOD FOR RECOVERY OF A COMPUTER PROGRAM INFECTED BY A COMPUTER VIRUS

[75] Inventor: Omri Mann, Jerusalem, Israel

[73] Assignee: Symantec Corporation, Cupertino, Calif.

[21] Appl. No.: 881,859

[22] Filed: May 12, 1992

Related U.S. Application Data

[63] Continuation-in-part of Ser. No. 705,390, May 24, 1991, abandoned.

[51] Int. Cl.[5] .................... H04L 9/00; G06F 7/02
[52] U.S. Cl. ........................ 395/575; 380/4; 380/25; 371/19
[58] Field of Search .............. 395/575; 380/4, 24, 380/25; 371/14, 19, 67.1

[56] References Cited

U.S. PATENT DOCUMENTS

| | | | |
|---|---|---|---|
| 4,734,856 | 3/1988 | Davis | 364/300 |
| 4,975,950 | 12/1990 | Lentz | 380/4 |
| 5,050,212 | 9/1991 | Dyson | 380/4 |
| 5,121,345 | 6/1992 | Lentz | 364/550 |
| 5,144,660 | 9/1992 | Rose | 380/4 |
| 5,163,088 | 11/1992 | LoCascio | 379/95 |
| 5,274,807 | 12/1993 | Hoshen et al. | 395/650 |

OTHER PUBLICATIONS

CAK Computer Anwendungen Oct. 1989, Braunschweig DE pp. 44–53, T. Börstler et al, 'Sabotage vorprogrammierti! Computer-Viren bedrohen die Datenbestände', p. 52, left column, line 1–line 11.

Chip Zeitschrift fuer Mikrocomputer-Technik, Nov. 1989, Wurzburg DE, pp. 233–238, Gunter Mubtopf 'Drei Schritter zur Heilung', p. 236, right column, line 22–line 45.

Chip Zeitschrift fuer Mikrocomputer-Technik, Feb. 1989, Wurzburg DE pp. 88–97, Jurgen Bernau et al, 'Viren schützen gegen Viren', p. 90, left column, line 1–line 45.

*Primary Examiner*—Robert W. Beausoliel, Jr.
*Assistant Examiner*—Dieu-Minh Le
*Attorney, Agent, or Firm*—Ladas & Parry

[57] ABSTRACT

A recovery technique allows a computer program to be recovered from a program which has been infected with a computer virus. Prior to the program being infected, a unique fingerprint of the program is taken and stored along with data relating to the beginning portion of the program at a location separate from the program. A program thought to be infected is processed by generating a fingerprint of a string in the program utilizing the stored data. The fingerprint that is generated is compared with the stored fingerprint to determine whether or not the two fingerprints match. If the fingerprints match, the program is restored from the stored information and the string. If the fingerprints do not match, the value utilized to select the string can be incremented and the process repeated.

7 Claims, 10 Drawing Sheets

METHOD FOR RECOVERY OF A COMPUTER PROGRAM INFECTED BY A COMPUTER VIRUS

CROSS REFERENCE TO RELATED APPLICATION

This application is a continuation-in-part of copending application Ser. No. /07,705,390 filed May 24, 1991 now abandoned.

BACKGROUND OF THE INVENTION

Computer viruses burst onto the scene a few years ago and quickly became a major threat to the reliability of computer programs. A "computer virus" is so named because it is a piece of self-replicating code that attaches itself to a computer program. The code utilizes the computer program as a means for "infecting" another computer program by attaching a replica of itself to that program. The computer virus normally attaches itself to the permanent copy of the program, such as found on a hard disk, so that the virus is not lost once the power is turned off.

Computer viruses as a prank can be harmless except for the fact that they utilize valuable memory space. However, the prank can turn into vandalism if the computer virus intentionally or unintentionally damages the program. Computer virus "time bombs" can lay dormant within the memory of the computer until a certain event, such as a particular date and time occurs, and then spring into action, creating havoc within the computer system.

Various methods of the technicomputer viruses are known in the art. The typical computer virus detection program involves a compilation of the known viruses that affect computers and a program that searches for these viruses based upon their known means of infection. Another technique is utilized in a program known as V ANALYST II sold by BRM Technologies, Ltd. in which a "fingerprint" of a program is taken prior to infection and stored at a remote location. Alterations in the fingerprint taken at a later time are indicative of infection of the program.

Restoration of a computer program after it has been infected by a computer virus can be effected by copying a clean copy of the program from a backup file. However, in large computer systems, such as shared networks, this can be a time consuming process. In view of the large number of users of such systems, these systems are more vulnerable to a computer virus entering the system through one of the many users which further exacerbates the problem. In addition, where computer programs are constantly being changed in such a system, it is necessary to make frequent backup copies which result in the storage of enormous amounts of information. Accordingly, there is a need for a simple and rapid means to restore a computer program which has been infected with a computer virus.

SUMMARY OF THE INVENTION

It is a general object of the present invention to provide a method restoring a computer program infected by a computer virus. Another object of the present invention is a method to restore a computer program infected by computer virus which has a high probability of attaining the original program from the infected program.

Yet another object of the present invention is a method of restoring a computer program infected by a computer virus in which a minimal amount of information must be stored for each program.

A further object of the present invention is a method for restoring a computer program infected by a computer virus which can be performed quickly.

A still further object of the present invention is a method of restoring a computer program infected with a computer virus which does not require a table of known viruses in order to reconstruct the program.

Yet another object of the present invention is a method of storing the computer program infected with the computer virus which is unknown.

These and other objects and advantages of the present invention are provided in accordance with one aspect of the invention by a method of restoring a computer program infected by a computer virus comprising generating a unique fingerprint for a computer program prior to said program being infected; storing said unique fingerprint prior to said program being infected and data relating to a beginning portion of said program at a separate location; generating a fingerprint of a string in said program which is thought to be infected utilizing said stored data; comparing the fingerprint generated in step c) with the fingerprint stored in step b) and determining that the program can be restored if said fingerprints match; restoring said program from said string and said stored data if said comparison in step d) determines that restoration is possible.

Another aspect of the present invention includes a method of restoring a computer program infected by a computer virus comprising generating a unique fingerprint for a computer program prior to said program being infected; storing at a separate location after storing said unique fingerprint, data relating to a beginning portion of said program and a length of said program prior to said program being infected; selecting a starting location in said program having an address which exceeds a length of said stored beginning portion by a predetermined number; generating a fingerprint of a continuous string in said program, having a length equal to said stored program length, utilizing said stored data relating to said beginning portion; comparing the fingerprint generated in step c) with the fingerprint stored in step b) and determining that the program can be restored if said fingerprints match; restoring said program from said string and said stored data if said comparison in step e) determines that restoration is possible.

A further aspect of the invention comprises a method of restoring a computer program infected by a computer virus comprising generating a unique fingerprint for a computer program prior to said program being infected; storing at a separate location said unique fingerprint, data relating to a beginning portion of said program and a length of said program prior to said program being infected; generating a fingerprint of a string formed of first and second sub-strings, said first sub-string having a starting point which is after an ending point of said program and having a predetermined length, said second sub-string having a starting point offset from a beginning of said program by said predetermined length, the combined lengths of said first and second sub-strings being equal to said stored program length, said fingerprint being generated utilizing said stored data relating to said beginning portion; comparing the fingerprint generated in step c) with the fingerprint stored in step b) and determining that the program can be restored if said fingerprints match; restoring said program from said string and said stored data if said comparison in step d) determines that restoration is possible.

A further object of the invention includes a method of restoring a computer program having fixup tables and being infected by a computer virus comprising generating a unique fingerprint for a computer program prior to said program being infected; storing at a separate location said unique fingerprint, data relating to a beginning portion, of said program and a length of said program prior to said program being infected; determining a length of said virus; determining an integer fixup shift equal to said virus length divided by 16; generating a modified fixup table having a segment portion of each address reduced by said fixup shift; generating a fingerprint of a concatenation of said stored beginning portion, said modified fixup table and a continuous string having a starting point equal to 16 times said fixup shift bytes after an end of said fixup table and having a length of said stored length of said fixup table and minus said stored length of said beginning portion; comparing the fingerprint generated in step c) with the fingerprint stored in step b) and determining that the program can be restored if said fingerprints match; restoring said program from said string and said stored data if said comparison in step d) determines that restoration is possible.

Yet another aspect of the present invention includes a method of restoring a computer program infected by a computer virus generating a unique fingerprint for a computer program prior to said program being infected; generating a first string which is a transitive invertable function of a first plurality of substrings of said program; storing said unique fingerprint and said first string prior to said program being infected at a separate location; generating a substring of said program from said first string and said program; generating a fingerprint of a second string formed of a second plurality of substrings of said program and a trial substring generated from said program and said first string; comparing the fingerprint generated in step e) with the fingerprint saved at step c) and determining that said program can be restored if said fingerprints match; restoring said program from said substrings if said comparison in step f) determines that restoration is possible.

BRIEF DESCRIPTION OF THE DRAWINGS

FIG. 1 illustrates infection of a program by one type of computer virus which attaches itself to the beginning of the program.

FIG. 2 illustrates an infection of the computer program by another type of computer virus which attaches itself to the front of the program and moves that portion of the program which is displaced to the end of the program.

FIG. 3 illustrates infection of a computer program having fixup tables.

FIG. 8 illustrates an infection of a computer program by a virus which modifies a portion of the program.

DETAILED DESCRIPTION

Figure 1A:
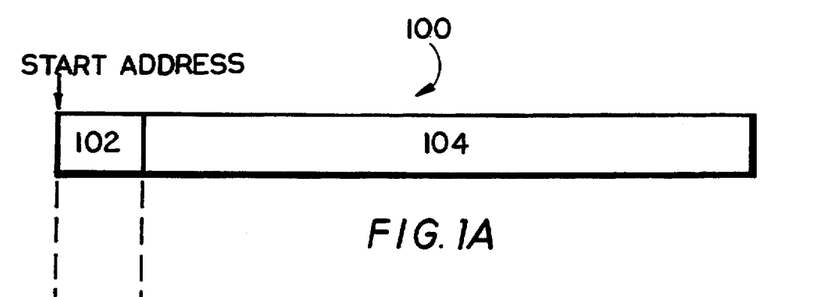
FIG. 1A shows the uninfected program.
Figure 1B:
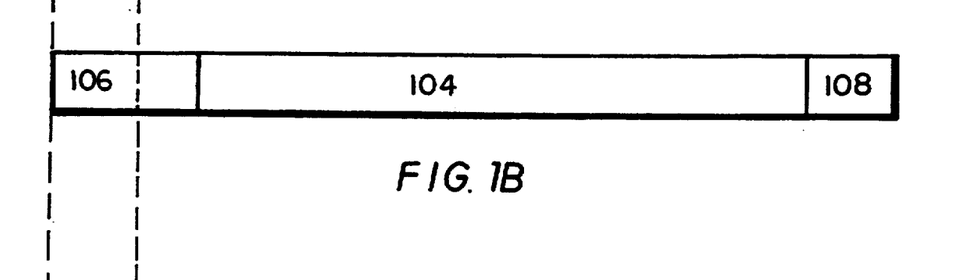
FIG. 1B shows the infected program and FIG. 1C illustrates the technique in restoring the program.

Computer viruses infect computer programs in various ways. FIG. 1A shows a diagram of a computer program having a series of instructions and generally shown as 100. The program comprises a "header" which, as well known to those skilled in the art, contains specified information regarding the program such as the entry point of the program, the initial stack location and the load image size which is typically 40 bytes in length. The program also comprises the computer code 104 which is generally very much larger than the header and is usually in the range of a few kilobytes to hundreds of kilobytes. FIG.1B shows the program 100 infected by a computer virus 106. The virus can be any length depending upon the function the virus is to perform, although it is typical for a virus to be several kilobytes in length. The virus 106 has attached itself to the beginning portion of the program thus overriding the header 102. The virus may also add a portion of code 108 to the end of the program. This is particularly useful in showing the virus that this file has been infected so that file is not infected a second time. This is important because the virus necessarily extends the length of the file because the virus is longer than the header. If the virus were to reinfect the file again, the file would grow longer and longer and would be finally be unexecutable, thus giving away the virus'presence. The goal of the virus is to remain in the permanently stored copy of the file, typically on a hard disk. Then, each time the file is executed, the virus can be activated to infect another file. In the infected file 100 shown in FIG.1B, the virus has placed itself at the beginning of the program. Once the program is activated in the computer's memory, the virus will take control and perform its replication function in one or more other programs stored on the hard disk before passing control to the program so that the program can be executed. By having the program execute in its normal manner, the presence of the virus is hidden, which allows the virus to infect all files within the system.

In order to be able to restore the program 100, it is necessary to store certain information regarding the program in advance of the program being infected by a virus. This information comprises a "fingerprint" of the program and may also enclose information such as the length of the program. The "fingerprint" is a unique signature which will identify the program. Typically this would be an error checking code, such a cyclic redundancy check, which codes are well known to those skilled in the art and need not be discussed in detail here. As is well known to those skilled in the art, the greater the number of bits in the error checking code, the lower the probability is of an error. Thus, there is a tradeoff between increasing the number of bits which lowers the probability of an error and the amount of time required to process the error checking code and the amount of information which must be stored for each program. The information stored in advance also includes information regarding the beginning portion of the program, such as the header. Although it is not required to store all of this information, typically the header, which only comprises about 40 bytes of information, is stored for each program. For safety, this information is stored at a location other than that of the original program.

Figure 7:
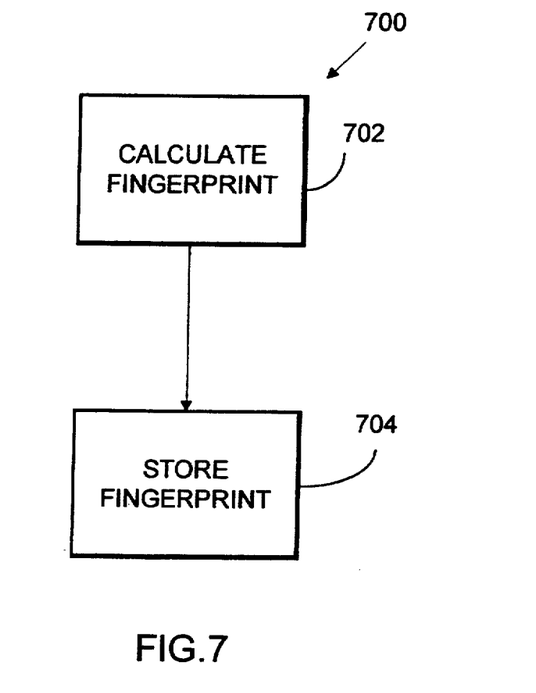
FIG. 7 is a flow diagram illustrating the fingerprint process.

Referring to FIG. 7, a flow diagram of the event sequences in producing the stored information is generally shown as 700. In block 702 the "fingerprint" of the program is generated using an error detecting code such as a cyclic redundancy check. Other techniques such as a checksum or an exclusive - OR of words in the program can also be utilized as can other techniques which produce a unique signature for each program. This information is transferred to block 704 at which, the information is stored at a remote location with other information regarding the files such as the header of the file and the program length. This program is repeated for each program for which the recovery ability is desired prior to the program being infected by a virus.

Figure 1C:
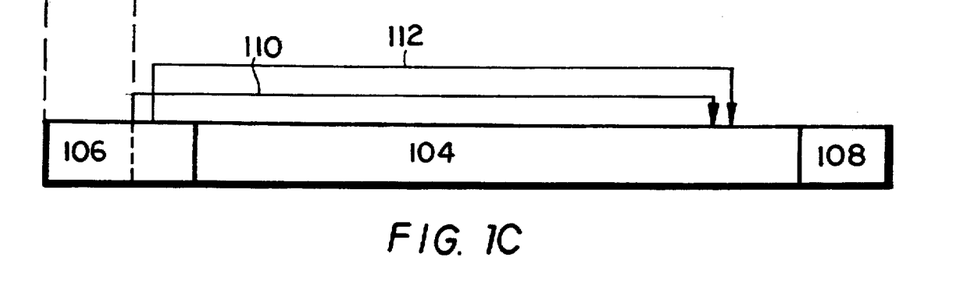
Figure 4:
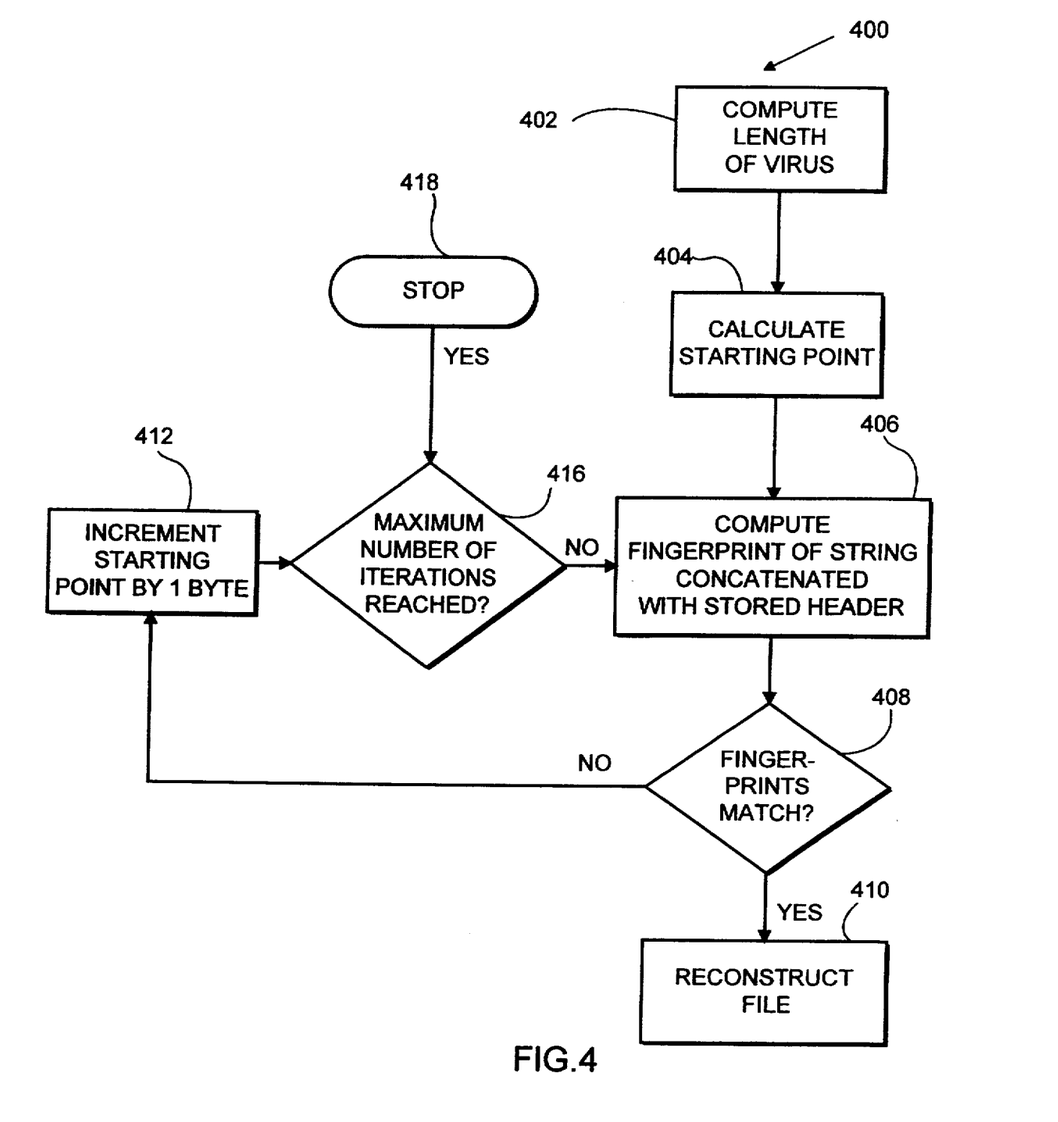
FIG. 4 is a flow diagram of the event sequences of the technique illustrated in FIG. 1C.

Referring now to FIGS. 1C and 4 a series of events will now be described in which the program 100 is restored, if possible. It is not always possible to restore a program that has been infected by a virus because the virus may intentionally or unintentionally damage the program, such as erasing or overriding a portion of the program. In such cases, recovery of the program is only possible if backup copies are available.

Referring FIGS. 1C and 4, which illustrates a technique for restoring a program infected as shown in FIG. 1B, a flow diagram of the events of this process is generally shown as 400. The process starts at block 402 in which the length of the virus is computed. The length of the virus is determined to be the difference between the length of infected program and the length of the original program, which information was stored at the remote location. The length of the virus is taken as the maximum number of iterations through the technique that is necessary in order to restore the program. If restoration is not possible after this number of iterations, it is assumed that the program can not be restored by this technique.

The process then proceeds to block 404 in which the starting point of the fingerprint is calculated. As shown in FIG. 1C, the program assumes that the starting point of the program is the same as it was before the header 102 was replaced with the virus 106. In general, the virus 106 is longer than the header 102 and this will no longer be the case. However, it is possible. The starting point is computed by taking the starting point of the infected program and adding the saved header size to generate the first address at which the program 102 is assumed to start. This is shown diagrammatically by our 110 in FIG. 1C. This information is input to block 406 in which the fingerprint of the program is computed. So the program code 104 has the same length after infection by the virus as it did prior to the infection by the virus. Block 406 takes a string having the computed starting address and having the length of the program code 104, which information was stored at the remote location. The length of the string is the size of the clean program less the size of the header. Block 406 then computes the fingerprint for this string concatenated with the stored header. The same technique is utilized to generate the fingerprint as well as utilized to generate the fingerprint prior to infection. These techniques can be error checking codes such as cyclic redundancy checks, checksums or an exclusive - OR of words in the program, for example.

The fingerprint is then passed to block 408 in which is it is compared with the fingerprint that was prepared and stored prior to infection. If there is a match between the fingerprint that was just generated and the stored fingerprint, then the program proceeds to block 410. If there is no match between the fingerprint generated and the stored fingerprint, the program proceeds to block 412.

In block 412, the starting point for the string shown diagrammatically as 110 in FIG. 1C is incremented by 1 byte and a counter is incremented by 1. The new starting point and counter value are passed to block 416.

In block 416 the counter is checked to see if it is equal to the computed size of the virus. If it does equal the computed size of the virus, this is the maximum of iterations that the program should utilize to try to restore the program. The program thus concludes that restoration is not possible using this technique and control passes to block 418 in which operation is stopped. The user may be notified at this point that restoration is not possible or other restoration techniques, as described below, can be utilized to try to restore the program. If the counter does not equal the size of the virus, control is passed back to block 406.

At block 406, the fingerprint is generated utilizing a string having a new starting point but having the same length as the first try. This is indicated diagrammatically in FIG. 1C by arrow 112. The process is continued until the program terminates in block 418 or block 410.

In block 410, the file is reconstructed utilizing the string which has a fingerprint that matches the originally stored fingerprint. The file is reconstructed by adding the original header to the string and deleting all other parts of the program.

Figure 2A:
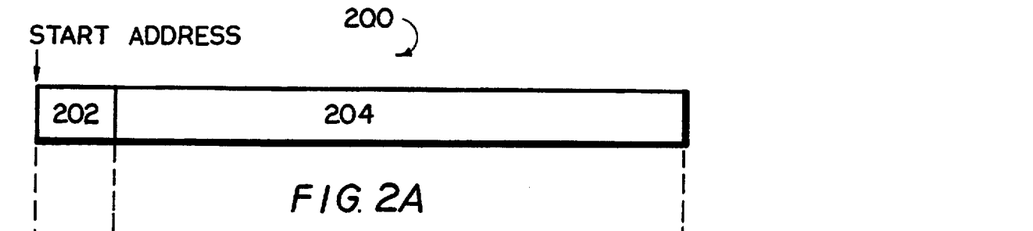
FIG. 2A illustrates the uninfected program.
Figure 2B:
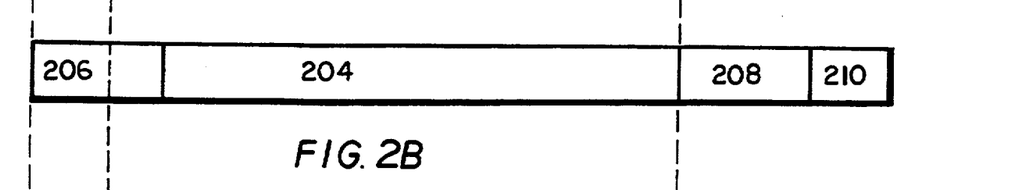
FIG. 2B illustrates the infected program and FIG. 2C illustrates the technique in restoring the program.

FIG. 2 illustrates a second common type of computer virus infection. A computer program generally shown as 200 in FIG. 2A has a header 202 and program code 204. FIG. 2B illustrates infection of this program with a virus in which the virus 206 has replaced code at the beginning of the program. In this case, the instructions which have been displaced by the virus 206 are rewritten at location 208 at the end of the program. A jump instruction is placed at the end of code 208 to return to the remainder of the code 204 to continue execution of the program code. This is illustrated diagrammatically by arrow 211 in FIG. 2B. The virus may also place additional codes at the end of the program, as illustrated by reference numeral 210. In this mode of infection, when the program is executed, the virus performs its infection and infects one or more additional files in the computer. Once the task is complete, it executes a jump instruction to the original beginning of the program which has been displaced to location 208. This is illustrated diagrammatically by arrow 213 in FIG. 2B. The program code 204 then executes as it would normally, thus making the presence of the virus transparent to the user of the computer. Thus the virus is free to replicate itself without protection.

Figure 2C:
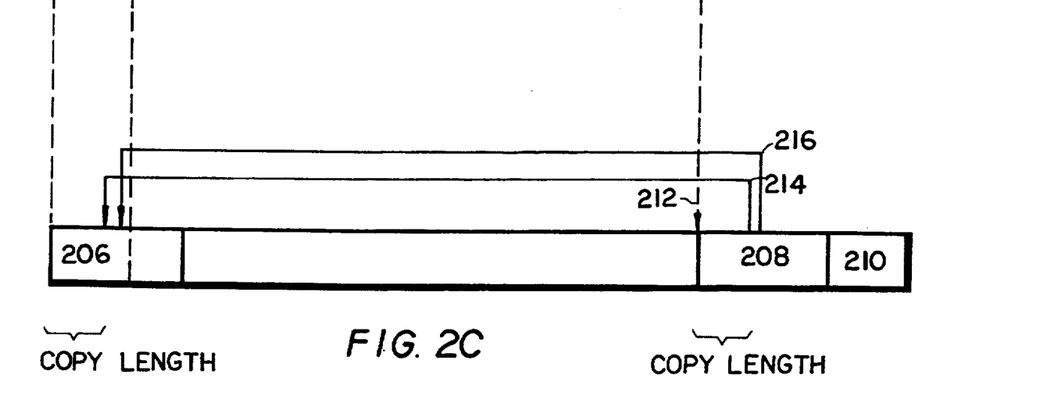
Figure 5:
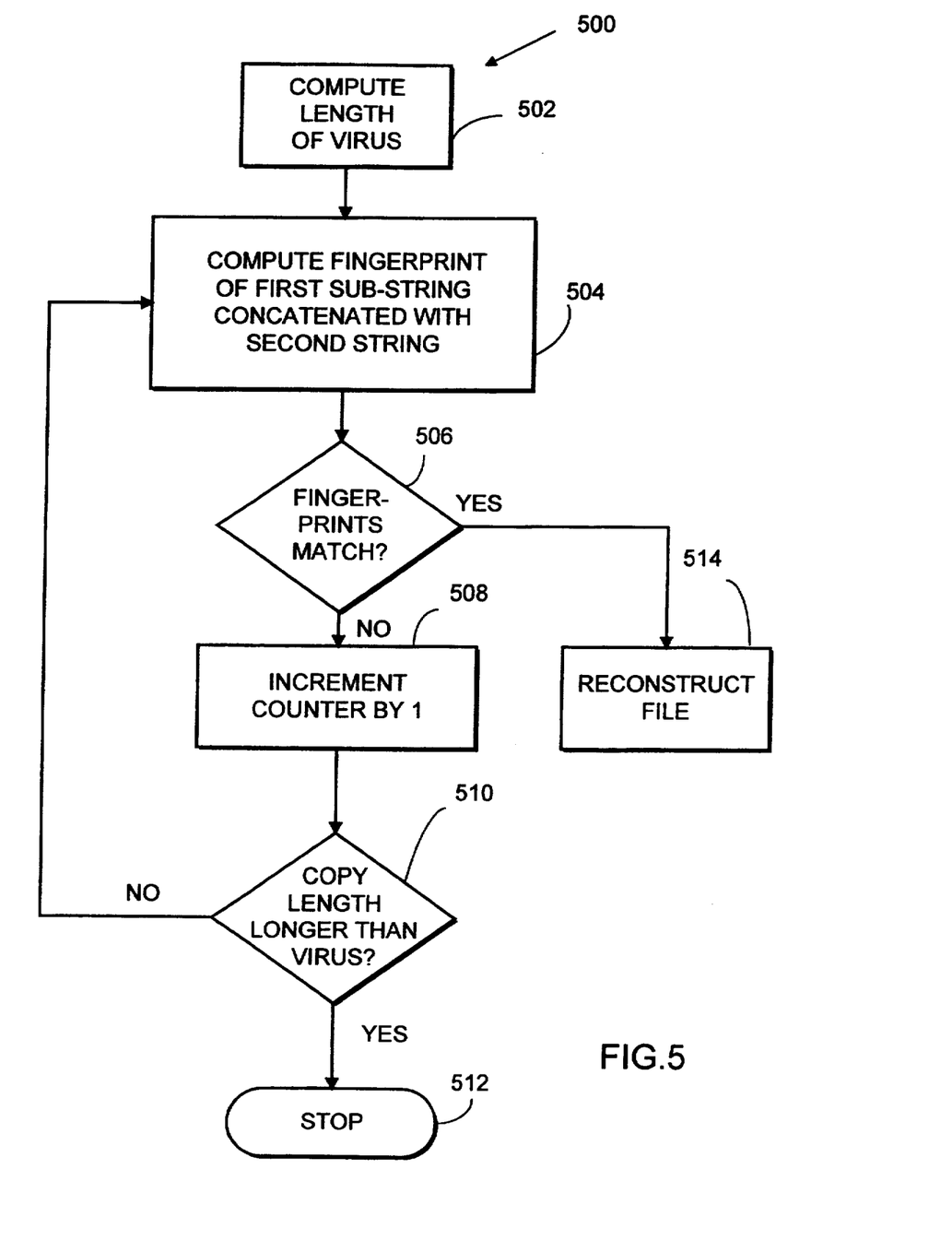
FIG. 5 is a flow diagram of the event sequence of the technique illustrated in FIG. 2C.

Referring specifically to FIGS. 2C and FIG. 5, a technique for restoring a program infected in this manner will be described. It should be understood that the fingerprinting process described above which is performed prior to infection must have been performed for this method to perform the restoration function. However, this technique can follow the technique illustrated in FIGS. 1C and 4 utilizing the same information utilized by that technique. That is, only a single fingerprinting prior to infection is needed for both techniques and the technique described in connection with FIGS. 3 and 6 to be performed. Referring specifically to FIG. 5, a flow diagram of the events of this technique is illustrated generally as 500. The program starts in block 502 at which the length of the virus, as described above, is computed. A counter, which is designated as the "copy length" is set at a value of 1. The program then proceeds to block 504.

In block 504, the program is assumed to start at the end of code 204 at point 212 in FIG. 2C. A first sub-string starting at point 212 is chosen having a length which is equal to the copy length described above. A second string is chosen having a starting point which is displaced from the starting address of the program shown in FIG. 2B and 2C by the copy length as illustrated by arrows 214 and 216 and proceeding until the end of the original program 204.

The fingerprint of a concatenation of the two sub-strings and the stored header is then generated. Control passes to block 506.

In block 506, the fingerprint is compared with the originally stored fingerprint. If the fingerprints match, control is passed to block 514 in which the program is restored. If the fingerprints do not match, control is passed to block 508.

In block 508, the counter set to the copy length is incremented 1. Control passes to decision block 510.

In decision block 510, the copy length is compared to see if it is longer than the virus length. If it is, then control passes to block 512 at which it is determined that the program is not recoverable by this technique. If the copy length does not exceed the virus length, control passes back to block 504.

In block 504, two new sub-strings are selected. The first sub-string has a starting point at point 212 in FIG. 2C and a copy length which is 1 byte than the copy length illustrated in FIG. 2C. The second sub-string starts at a location 1 byte further from the starting address of the program and continues until the end of file 204, as illustrated by arrow 218, 220. The process is repeated for a maximum number of iterations equal to the virus length at which point it will either be stopped at block 512 or have reached reconstruction at block 514.

Reconstruction at block 514 is similar to the reconstruction described in connection with the embodiments of FIG. 4 and FIG. 1C. The reconstructive program consists of a concatenation of the stored header and the two sub-strings. All other program code is deleted.

Figure 3A:
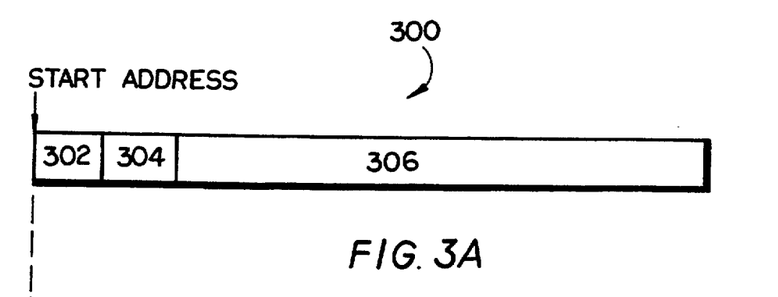
FIG. 3A illustrates the uninfected program.

A third type of computer infection occurs in files having fixup tables following the header. These type of files are commonly found in .EXEC files in MS-DOS (Trademark of Microsoft Corp.) operating systems. Referring to FIG. 3A a program of this type is generally shown as 300. The program consists of a header 302 followed by a fixup table 304 followed by the program code 306. The purpose of the fixup table, as is well known to those skilled in the art, is the result of the addressing scheme chosen for the type of processor utilized in these operating systems. The processor is a 16 bit microprocessor and the address scheme requires a 20 bit address. As a result, the memory is broken up into a plurality of 64 kilobyte segments and the address comprises a segment number plus an offset number. Both the segment and offset numbers are 16 bit numbers. However, the segment number is multiplied by 16 which produces a 20 bit address, which when added to the 16 bit offset number also results in a 20 bit address. Overflow of the 20 bit address is the responsibility of the computer programmer.

In programs which exceed 64 kilobytes in length, the addresses referred to in the program are related addresses. When the program is loaded into memory by the operating system, the operating system has to correct these addresses in order to produce an absolute address for the jump instructions. The fixup table contains a list of pointers to addresses which contain the relative addresses. When the file is loaded into memory, the operating system goes to each of the addresses having a pointer and adds the absolute address of the beginning instruction of the program to the relative address in the program in order to obtain the absolute address of the jump instruction. The addressing technique is well known to those skilled in the art.

Figure 3B:
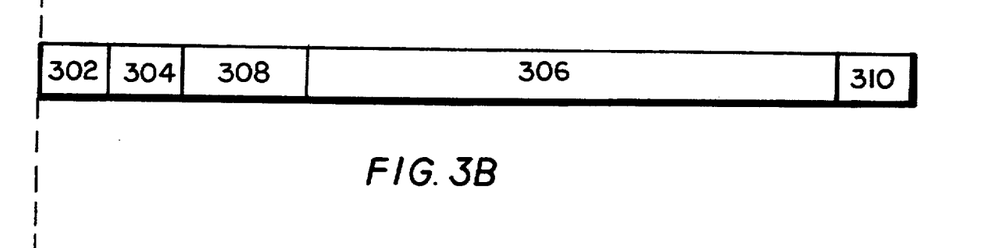
FIG. 3B illustrates the infected program and FIG. 3C illustrates the technique utilized in restoring the program.

FIG. 3B shows a program of this type which has been infected with a virus. The header 302 and fixup table 304 are unaffected. The virus 308 is inserted after the fixup table 304 and before the program code 306. A portion of virus may also be added at the end of the program code shown as 310.

In inserting itself between the fixup table 304 and the program code 306, the virus 308 must then change the fixup table to point to the new addresses of the jump instructions. The addresses of the jump instructions are necessarily moved by the length of the virus 308. Thus, it is necessary to add the length of the virus 308 to each of the pointers found in fixup table 304.

Figure 3C:
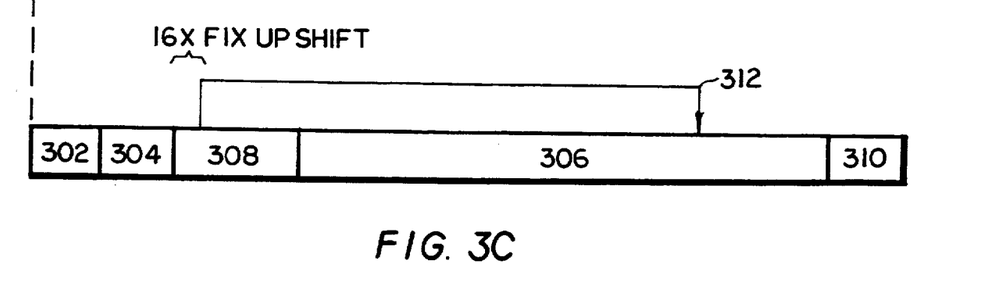
Figure 6:
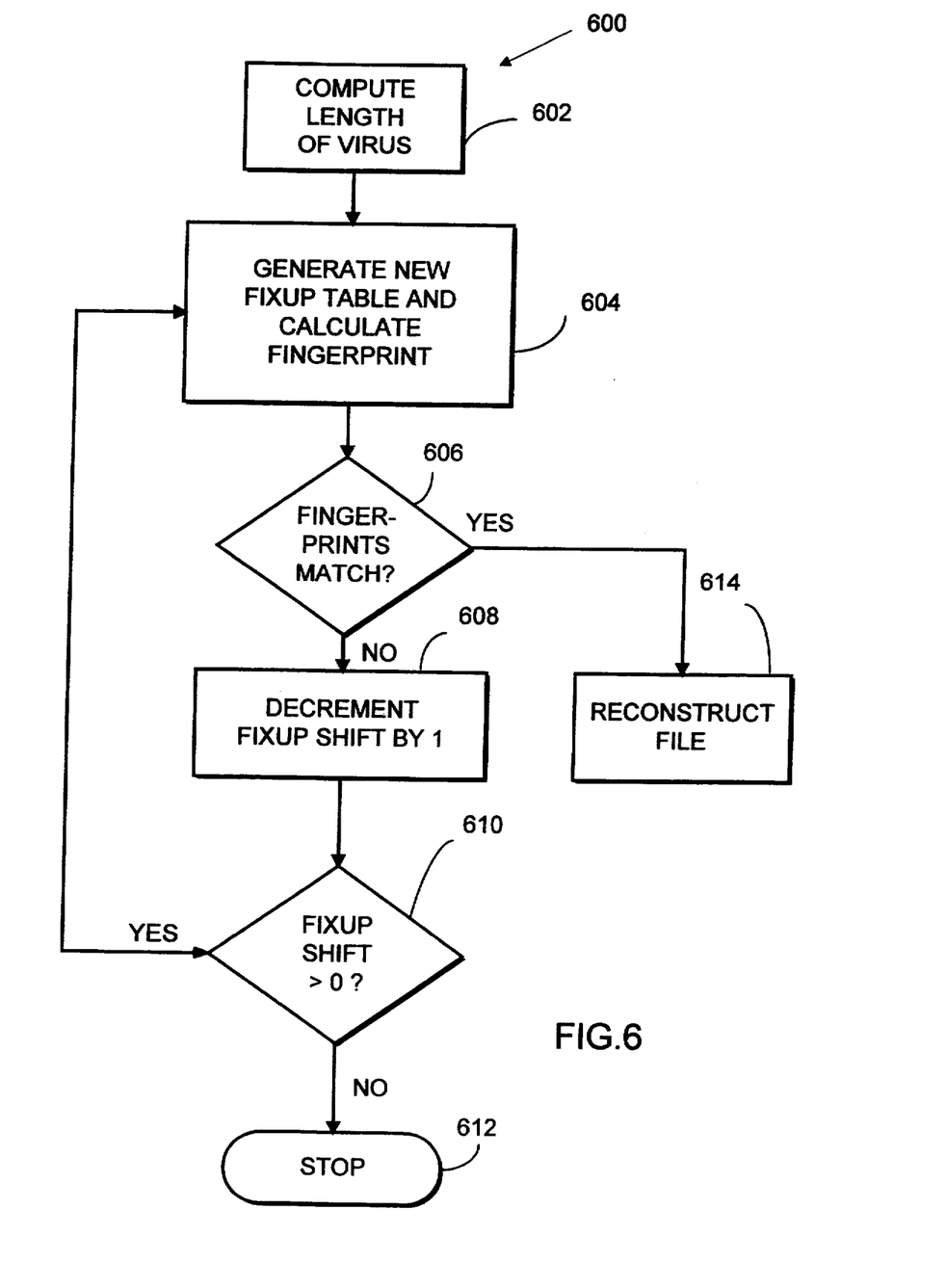
FIG. 6 is a flow diagram of the event sequence of the technique illustrated in FIG. 3C.

Referring to FIG. 3C and FIG. 6, a technique for restoring the program 300 infected by a virus 308 is illustrated generally as 600 in FIG. 6. It is assumed that fingerprint process has been performed prior to infection of the program, as described above. As stated earlier, it is unnecessary to perform this function more than once for all three recovery techniques to be utilized. The program starts in block 602 in which the virus length is computed as the difference in length between the affected and the non-affected program. Next the "maximum fixup shift" is computed as the virus length divided by 16. Only the integer value of the "maximum fixup shift" is utilized, any fractional value is discarded. Control then passes to block 604.

In block 604, a new fixup table is generated which is identical to the previous fixup table except that the segment part of each address is reduced by the fixup shift. A string is chosen starting at a point 16 times the fixup shift bytes after the end of the fixup table and having a length which is the length of the original file minus the length of the fixup table and the length of the header, which data has been stored prior to infection. The fingerprint is generated on a concatenation of the original saved header, the newly generated fixup table and the string. Control then passes to decision block 606.

In decision block 606, the fingerprint is compared against the fingerprint that was stored prior to infection. If the fingerprints match, control passes to block 614 in which the program is restored. If the fingerprints do not match, control passes to block 608.

In block 608, the fixup shift is decremented by 1 from the maximum fixup shift and control passes to decision block 610.

In decision block 610, the fixup shift is compared to see if it exceeds zero. If the fixup shift does not exceed zero, then control passes to block 612 at which point the program is stopped as recovery by this technique is not possible. If the fixup shift does exceed zero, control passes to block to block 604.

In block 604, a new fixup table is generated to utilizing the new fixup shift and a new string is chosen having a starting address equal to 16 times the fixup shift and the process is repeated until the program terminates at block 612 indicating that recovery is not possible by this technique or at block 614 at which the program is recovered.

In block 614, the program is recovered as a concatenation of the stored header, the newly generated fixup table and the string which corresponds to the newly generated fixup table. All other instructions are deleted.

Figure 8A:
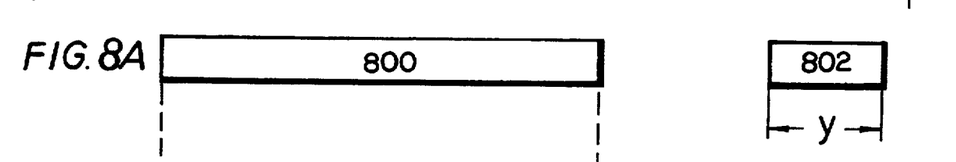
FIG. 8A illustrates the uninfected program.

A fourth type of computer infection occurs in files in which the virus attaches itself to the end of a program and modifies a small portion of the program at any location within the program, which modification causes the execution of the computer program to jump to the end of the program, where the main body of the virus is stored. This type of infection is illustrated in FIG. 8. In FIG. 8A a program generally shown as 800 includes the header, if a header is provided. Some computer programs, such as .COM files in MS-DOS do not have a header but are loaded into memory and run. In these type of programs, it common to have a jump instruction to the starting point of the program, which is considered entry point for the program for purposes of the discussion below.

Figure 8B:
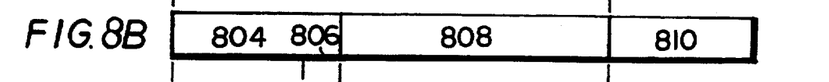
FIG. 8B illustrates the infected program.

FIG. 8B illustrates the program infected by the virus. Portions 804 and 808 are the unmodified portions of the program 800. Portion 806, greatly exaggerated in FIG. 8B for purposes of illustration, is the portion of the program modified by the virus in order to insert a jump instruction into the program. The jump instruction in portion 806 instructs the execution of the program to jump to portion 810, which has been added to the end of the program and which contains the bulk of the instructions of the virus. The jump instructions in portion 806 may contain less than 60 bytes of code, for example.

Because a portion of the program has actually been changed, it is not possible to restore the program by the previous techniques, because information, in addition to the "fingerprint", is needed.

In order to provide this additional information, the program is divided into a series of blocks, illustrated in FIG. 8A as block 802. Each block has a predetermined length illustrated as y which may be, for example, 60 bytes. The block length should be longer than the longest anticipated portion length 806, which contains the modified portion of the program. If the program is not equally divisible by the chosen block length, the last block is filled with zeros in order to produce a complete block. The first byte in each block is then exclusive ORed with the corresponding information in all other blocks and this result is then saved. This process is repeated sequentially for each byte in the block until all y bytes have been exclusive ORed together. This information is then stored along with the fingerprint at a remote location.

Figure 10:
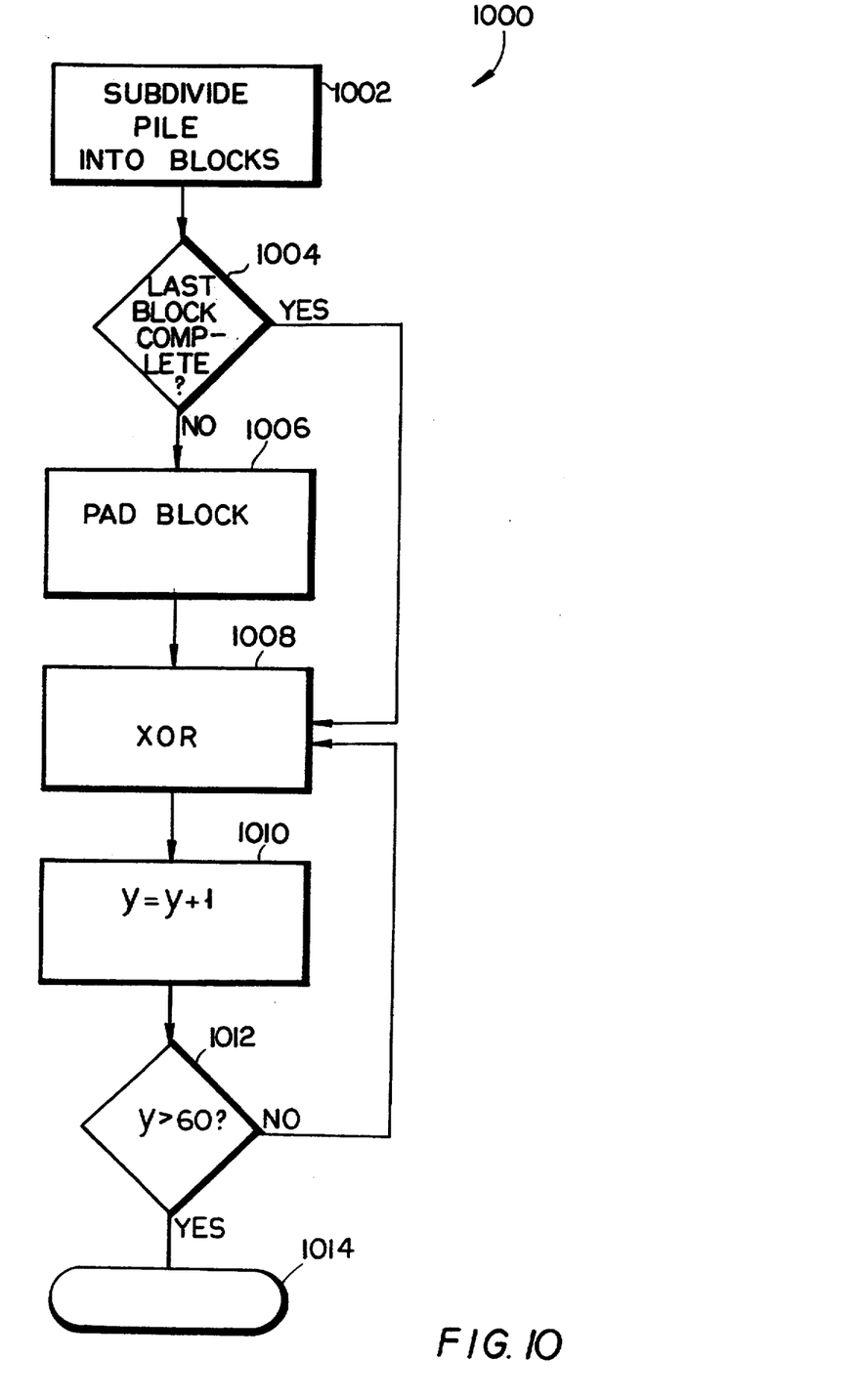
FIG. 10 is a flow diagram illustrating the exclusive OR process.

Referring to FIG. 10, a flow diagram of the event sequences in producing the additional information is generally shown as 1000. In block 1002 the program is divided into a plurality of blocks of length y. In block 1004, a decision is made as to whether or not the last block is a complete block. If the last block is a complete block, control passes to block 1008. If the last block is not a complete block, control passes to block 1006. In block 1006, the last block is completed by adding zeros in order to "pad" the block so that it is a complete block. In block 1006, the first byte in each block is exclusive ORed with the first byte and all other blocks and the result stored. Control passes to block 1010 in which a counter is incremented in which time control passes to block 1012. In block 1012, the counter is checked against the value y. If the value y has been exceeded, then the information is stored at block 1014, preferably at a remote location. If the value y has not been exceeded, control passes back to block 1008 and the exclusive OR is continued for the next byte in each block until all bytes have been exclusive ORed and the results stored.

This procedure must be performed before the program has been infected by the virus and is preferably performed at the same time that the fingerprint operation discussed above and illustrated in FIG. 7 is performed. For safety, the results of the exclusive OR operation are stored in a remote location, preferably at the same location at which the fingerprint information is stored.

Figure 8C:
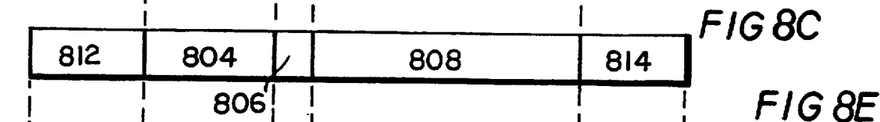
FIGS. 8C-8F illustrate the technique for restoring the program.
Figure 8D:
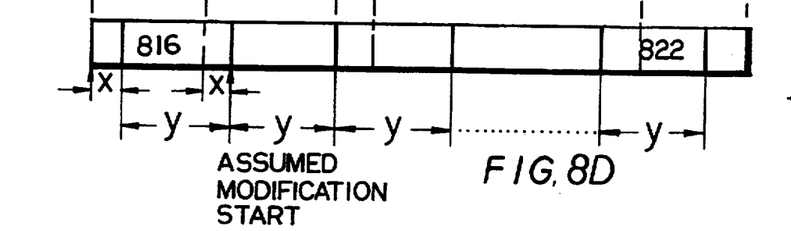
Figure 9:
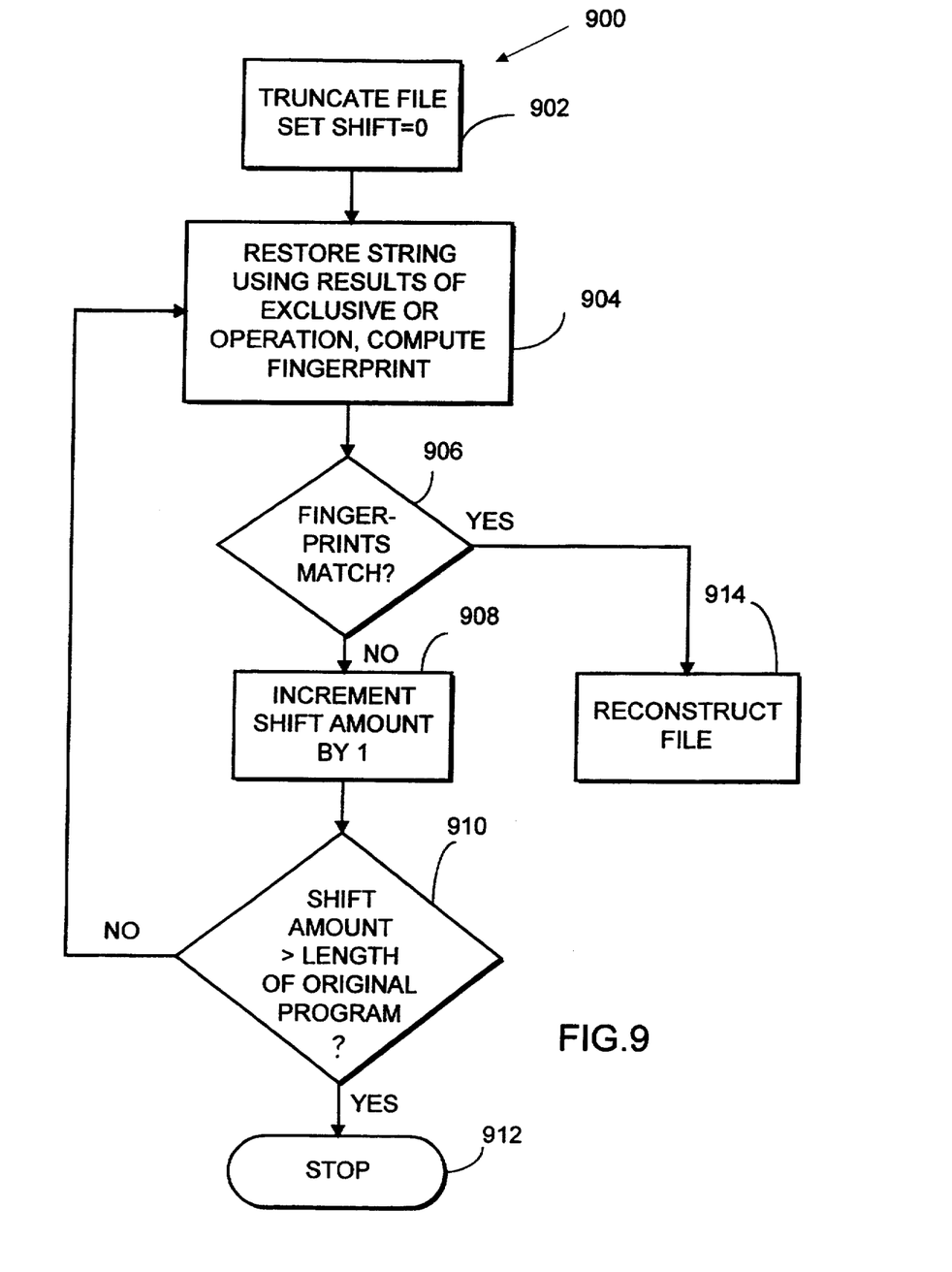
FIG. 9 flow diagram of the event sequences of the technique illustrated in FIGS. 8C-8F.

Referring specifically now to FIGS. 8C and 8D and FIG. 9, a technique for restoring a program infected in this manner will now be described. In FIG. 9, a flow diagram of the events of this technique is illustrated generally as 900. The process starts in block 902 in which the infected file is truncated to its original length based upon the information which has previously been stored. In addition, blocks of zeros 812 and 814 are added at the beginning and end, respectively of the file, as illustrated in FIG. 8C. The purpose of these blocks of zeros will be explained below. The assumed modifications start for the program is set equal to the beginning of the computer file.

Control then passes to block 904 in which the recovery attempt is made. A shift amount x, as illustrated in FIG. 8D is set equal to zero. With this instruction, it is assumed that the first block is the block which contains some instructions which have been overwritten by the virus and which then must be discarded. The (y + 1)th byte, which is the first byte of the second block is then exclusive ORed with the first bytes in all remaining blocks except for the first block. The process is then repeated for all of the bytes within the blocks, excluding the bytes of the first block. The result is then exclusive ORed with the information stored in block 802 illustrated in FIG. 8A. The result of this second exclusive OR operation is a block which contains the correct instructions for the first block, if the assumption is correct. In order to test the correctness of the assumption, the string is restored utilizing all of the blocks except for the first block which is replaced with the results of the second exclusive OR operation. A fingerprint operation is then performed on the restored string. Control passes to block 906. In block 906, the fingerprint of the restored program is compared with the fingerprint previously stored for the program. If the two fingerprints match, the program is correctly restored and control passes to block 914 in which the restoration program terminates and the restored program is made available to the user. If the program is not correctly restored, control passes to block 908. In block 908, x is incremented by 1 and control passes to block 910. In block 910, the value of x is compared against the length of the original program. If the value x exceeds the length of the original program, control passes to block 912 in which the restoration program terminates and the user is informed that it is not possible to restore the program using this technique. If x does not exceed the length of the original program, control passes back to block 904.

Figure 8E:
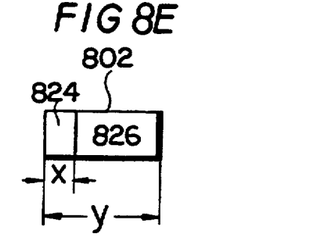
Figure 8F:
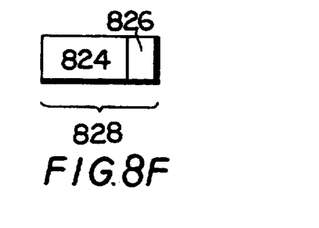

Having entered block 904 with x being said equal to 1, a new series of blocks are set up, as illustrated in FIG. 8D. In FIG. 8D, the assumed modifications start on the program is 1 byte higher in the program than in the previous iteration. This leaves the first byte without a block for its consideration. The first byte is therefore made part of a new block 816 which comprises all zeros except for the first byte, which is now the last byte of the block. Block 818 is still considered to contain the overwritten instructions. Newly formed blocks 820 and 822 are shifted by 1 byte to the right. The exclusive OR process is repeated utilizing the first byte of block 816, the first byte of blocks 820 and 822 and of all remaining blocks in the program. It is now clear the purpose of adding the blocks of zeros 812 and 814 to the beginning and end of the program. The blocks of zeros are used to complete the blocks which are otherwise incompletely formed by the shifting of the assumed entry point by x bytes during the process. That is, a new block is formed at 816 which comprises only the first byte of the program and a new block is formed at the end of the program in which the last block enters block 814 and utilizes 1 byte containing all zeros. The exclusive OR of all of the first bytes of all blocks except for block 818 is performed and the other bytes of the blocks are sequentially exclusive ORed with each other, again excluding block 818. However, it is not possible to compare this result with the information stored in block 802 because of the shifting of the blocks by x bytes. It is therefore required that block 802 be rotated by x bytes. This is illustrated in FIGS. 8E and 8F. FIG. 8E illustrates block 802 as containing two subblocks 824 and 826. Subblock 824 contains x bytes and subblock 826 contains the remainder of the bytes in block 802. FIG. 8F shows block 802 as illustrated in FIG. 8E rotated by x bytes. In the rotation, the subblock 826 is moved to the left by x bytes and the subblock 824, which is then pushed out the block is written into the emptied bytes at the right side of the block, as illustrated by block 828 in FIG. 8F.

The results of the first exclusive OR operation are then exclusive ORed with the rotated block 828 to produce a resulting block which is assumed to be the correctly restored block 818. The process is then repeated by obtaining the fingerprint of the string utilizing the restored block 818 and the remainder of the original program and by computing and comparing the fingerprints thereof.

The process continues until y bytes have been processed. At this point, the first block is no longer suspect and the process moves on to the second and subsequent blocks. In view of the fact that the process is repeated on a byte by byte basis, it is not necessary to keep track of the number of blocks being processed.

While a particular embodiment of the present invention has been disclosed herein, certain changes and modifications will readily occur to those skilled in the art. For example, although the length of the program and of the fixup table are indicated as being stored prior to infection, this is not absolutely required. It is possible for the computer to start with a particular assumed length, such as 1, and then increment this value for each possible solution in the recovery technique. This necessarily increases the amount of time necessary to recover the program. Furthermore, the greater the number of reiterations in the recovery technique, the greater is the probability that a false match with the fingerprint will occur. This possibility can be overcome by increasing the length of the fingerprint but little savings is produced as storing the lengths does not require a large amount of memory. Furthermore, although the present invention has been described in conjunction with a program for the microprocessor of the computer system, it is obvious that dedicated hardware circuitry could be provided within the computer to perform this function. In addition, although the fourth embodiment has been described utilizing an exclusive OR function, other invertable functions can be utilized as long as the order of operation does not matter, that is as long as the functions are transitive. Thus, addition could be utilized in place of the first exclusive OR operation and subtraction in place of the second exclusive OR operation, for example. All such changes and modifications can be made without departing from the invention as defined by the appended claims.

I claim:

1. A method of restoring a computer program infected by a computer virus comprising:
    (a) generating a unique fingerprint for a computer program prior to said computer program being infected;
    (b) generating a first string which is a transitive function of a first plurality of substrings of said computer program said function having an inverse function for calculating an unknown input given all other inputs and a value of the function;
    (c) storing said unique fingerprint and said first string prior to said computer program being infected at a separate location;
    (d) generating a substring of said computer program from said first string and said computer program by utilizing said inverse function;
    (e) generating a fingerprint of a second string formed of a second plurality of substrings of said computer program and a trial substring generated from said computer program and said first string;
    (f) comparing the fingerprint generated in step e) with the fingerprint saved at step c) and determining that said computer program can be restored if said fingerprints match;
    (g) restoring said computer program as said second plurality of substrings and said trial substring if said comparison in step f) determines that restoration is possible.

2. The method according to claim 1 where said transitive function is an exclusive OR.

3. The method according to claim 1 where said transitive function is a sum.

4. The method according to claim 1 wherein said fingerprint comprises an error detecting code for said computer program.

5. The method according to claim 4 wherein said error detecting code is a cyclic redundancy check.

6. The method according to claim 4 wherein said error detecting code is a checksum.

7. The method according to claim 4 wherein said error detecting code is an exclusive-OR of words in said computer program.

* * * * *

UNITED STATES PATENT AND TRADEMARK OFFICE
CERTIFICATE OF CORRECTION

PATENT NO.   : 5,349,655
DATED        : September 20, 1994
INVENTOR(S)  : OMRI MANN It is certified that error appears in the above-indentified patent and that said Letters Patent is hereby corrected as shown below:

On the title page, left column, item 63, "abandoned" should be -- now U.S. Patent 5,408,642 issued April 18, 1995 --.

Column 1, line 9, "abandoned" should be -- U.S. Patent 5,408,642 issued April 18, 1995 --.

Signed and Sealed this

Twenty-ninth Day of July, 1997

Attest:

BRUCE LEHMAN

*Attesting Officer*          *Commissioner of Patents and Trademarks*